Dec. 20, 1955     E. C. WARD ET AL     2,727,736
AUTOMATIC LOCKING DEVICE FOR SCALES
Filed June 10, 1954
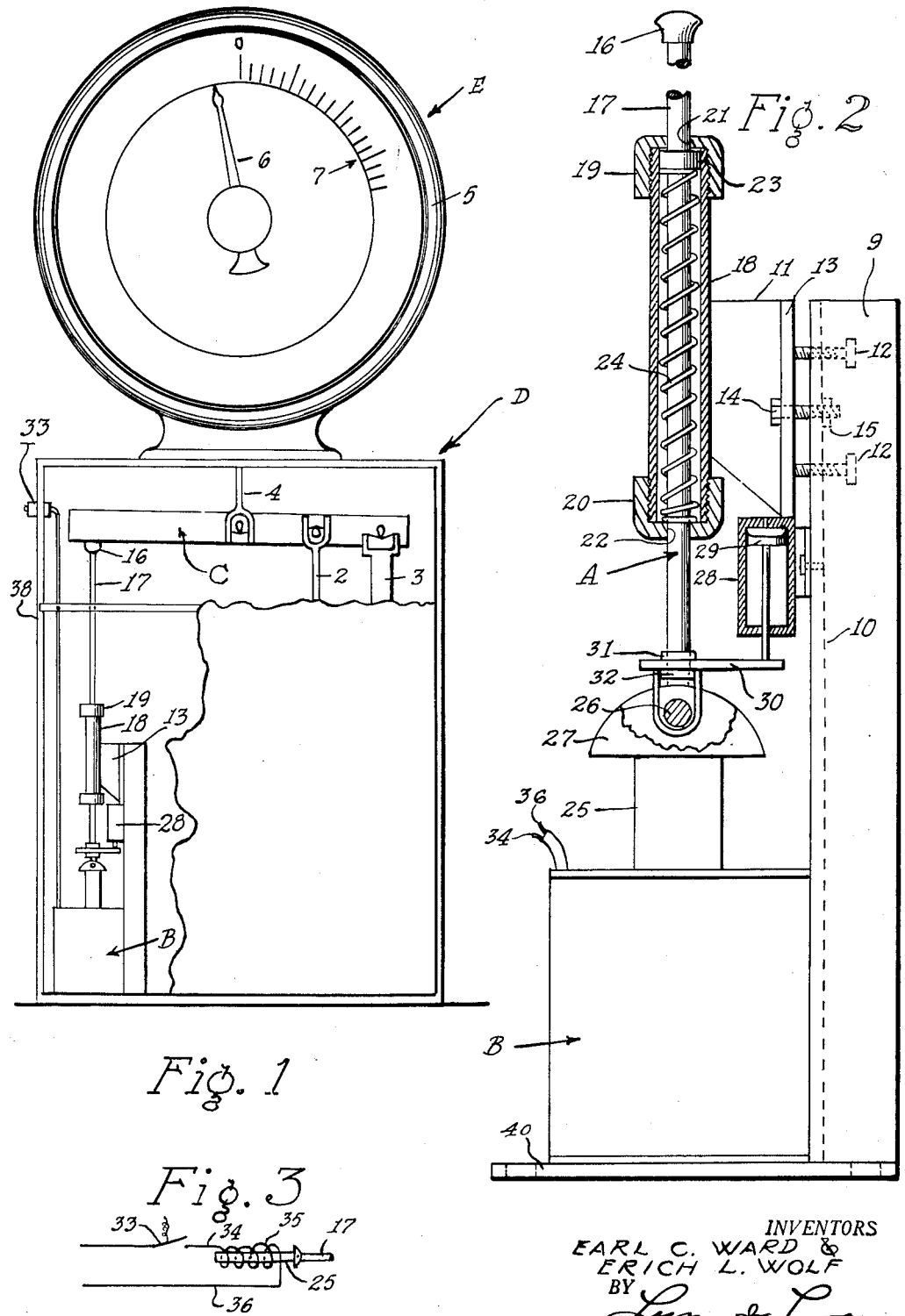
INVENTORS
EARL C. WARD &
ERICH L. WOLF
BY
ATTORNEY ns
2,727,736
AUTOMATIC LOCKING DEVICE FOR SCALES Earl C. Ward and Erich L. Wolf, Riverside, Calif.

Application June 10, 1954, Serial No. 435,821

5 Claims. (Cl. 265—72)

The invention relates to a locking device for locking the delicate weighing mechanism of a scale to prevent possible damage thereto.

It frequently happens that a load is carelessly placed on the platform of a scale thereby imparting a tremendous momentary overload which usually causes damage to the delicate mechanism of the scale.

Previous locking devices have been known in which alterations to the scale itself are necessary in order to utilize the locking device therewith. Other locking devices have been known in which the cost of manufacture is almost prohibitive.

An important object of the invention, therefore, is to provide a locking device for a scale which can be adapted thereto with a minimum of alteration in the scale itself.

Another object of the invention is to provide a locking device which is simple and relatively inexpensive to manufacture.

Another object of the invention is to provide a locking device incorporating a shock absorbing feature therein.

Another object of the invention is to provide a locking device with improved construction details and means for mounting same relative to the scale.

Other objects and advantages of the invention will be apparent from the ensuing specification and appended drawings in which:

Fig. 1 is a front elevational view, of a conventional cabinet type scale with the front cover partly removed and having the locking device mounted therein;

Fig. 2 is an enlarged side elevational view, partly in section, of the locking device per se;

Fig. 3 is a wiring diagram showing one form of operation of the device.

In the preferred form of the invention the locking device generally includes a plunger A which is pivotally connected to the end of the armature of a solenoid B, the plunger being engageable with the beam C of a conventional scale, referred to generally by the letter D, to prevent injury to the delicate weighing mechanism (not shown) which is incorporated within the head E of the scale, whenever the scale is not in use or preparatory to placing a load on the scale platform (not shown), which would be at floor level and in front of the scale.

In Fig. 1 we have shown one form of a conventional scale, this being a cabinet type scale wherein the load is placed on the platform and the force imparted to the scale by such load is transmitted by a conventional lever system through a steelyard rod 2 to the lever C, the lever being supported between the bearing bracket 3 and the connector rod 4. The downwardly directed force which is imparted to rod 4 is transmitted to the delicate dial mechanism (not shown) which is contained within the dial housing 5, thus revolving the indicator 6 to indicate the appropriate reading on the chart 7. Frequently the operator of a scale will suddenly drop a load on the platform of the scale, imparting an excessive sudden shock to the dial mechanism, thus damaging same; or will place on the platform of the scale a load in excess of the normal capacity of the scale, causing the indicating mechanism to travel beyond its normal limits, thus causing damage to the said mechanism.

By locking the lever C in a position in which the indicator needle 6 is "backed up" to a position in which the dial mechanism is resting against the stops which limit its travel in "no load" or "minus zero" direction as indicated in Fig. 1, then such "dropped" or "above capacity" loads when imposed on the platform will not result in any damage being incurred by the dial mechanism.

The locking device as shown in Figs. 1 and 2 includes an upright 9 which may, if desired, be in channel form having the front wall 10 to which the mounting bracket 11 is secured. Spaced set screws 12 may be threaded through the front wall of the upright 9 to provide spaced bearing posts against which the rear wall 13 of the supporting bracket engages. The cap screws 14 are threaded through the rear wall 13 of the supporting bracket and a nut 15 may be tightened against the upright wall 10 to securely anchor the bracket 11 against the ends of the adjustment screws 12. Thus the supporting bracket may be adjusted toward or away from the upright 9 until properly positioned so that the rubber foot pad 16 which is secured to the end of the plunger stem 17 will engage the lever C in the appropriate location thereon. The upright 9 is secured to base plate 40 which is secured to the floor of the scale.

A cylinder 18, which may be in the form of a standard length of pipe of standard diameter threaded at each end to accommodate the guide caps 19 and 20, which if desired may be standard pipe caps having bores 21 and 22 therethrough through which the plunger stem 17 is guided. The cylinder 18 is secured to the bracket 11 as by means of welding or otherwise. The plunger stem has a stop 23 which may be in the form of a collar secured thereto or in the form of an annular shoulder formed integrally with the plunger stem and the stop engages the upper cap 19 to limit the upward travel of the plunger stem 17 in scale locking direction. A compression spring 24 is positioned interiorly of the cylinder 18 and telescopically surrounds the plunger stem abutting the stop 23 at one end and the cap 20 at its opposite end. The spring normally urges the plunger stem upwardly into the scale locking position as shown in Fig. 1.

The lower end of the plunger stem may have pivotal connection to the solenoid armature 25 as by means of a pivot pin 26 which is secured to the armature head 27 which is an integral part of the solenoid armature.

A shock absorbing device in the form of a dash pot includes the cylinder 28 within which the piston 29 is reciprocably mounted and the piston stem rests on a plate 30 which may be adjustably secured to the plunger stem 17 between the collars 31 and 32. The cylinder 28 may be secured to the bracket 11 so as to be maintained parallel to the plunger stem 17 or may be fastened to the front wall of upright 9. The dash pot may be of the adjustable type if desired so that the upward travel of the plunger A into locking position with the lever C can be closely regulated so as to avoid any unnecessary jarring of the dial mechanism when the plunger engages the lever C. It will be understood that the locking device may be mounted on or fastened to other types of scales (for example, column type scales), performing the same general function to the end that the delicate mechanism within the head of such scale be protected from damage otherwise possibly inflicted as set forth hereinbefore. It will also be understood that while plunger A may be made to bear on beam C as fully described hereinbefore, it may also be made to bear against some other suitable portion of the mechanism, depending upon the type and style of scale involved.

Operation

In the operation of the locking device as shown in Figs. 1, 2 and 3 the solenoid B is normally de-energized, the switch 33 being normally opened thereby opening the conductor 34 which is connected to the coil or winding 35 of the solenoid, the conductor 36 serving as ground. When the switch 33 is closed, the solenoid becomes energized and the armature 25 is retracted thereby pulling the plunger A downwardly relative to the guide cylinder 18 and compressing spring 24 between the cap 20 and the stop 23, the spring thus being under tension during the period in which the solenoid is energized. With the switch 33 open the solenoid is de-energized and the spring 24 causes the plunger 17 to move upwardly until the rubber tip 16 engages the lever C thereby locking the scale during its period of non-use. The load is placed on the scale platform (not shown) while the scale is still locked thereby preventing any damage to the scale mechanism as has been fully set forth hereinbefore. With the load resting on the scale platform, then the scale is unlocked by closing the switch 33 thereby energizing the solenoid and retracting the plunger 17 to free the lever C so that the weighing of the load can be accomplished. After obtaining the reading on the dial 7, then the switch button is released and the switch immediately opens thereby de-energizing the solenoid and permitting the spring 24 to again force the plunger 17 into locking position against the scale lever C. The dash pot 28, as has previously been described, controls the upward stroke of the plunger 17 in its movement into locking position against the lever C. The locking device may of course be made in any desired size and capacity for being adapted to scales of varying capacity and in some instances it may not be necessary to employ the dashpot 28, in which case the collars 31 and 32 could be loosened and the plate 30 and the dashpot 28 removed from the locking device. The plate 30 can be bifurcated at the end which surrounds the plunger 17 to permit removal of same if desired.

It will also be understood that the switch 33 could be mounted on the wall 38 of the scale cabinet for manual actuation, the conductors 34 and 36 extending from the solenoid up to the switch, however, if desired the switch could be separated from the scale and could be a foot actuated switch or other form of electrical contact to free the hands for loading and unloading the items which are being weighed on the scale.

We claim:

1. A locking device for automatically locking the mechanism of a scale having a mounting wall for the locking device comprising: a bracket adjustably secured to the mounting wall; an elongated tube secured to the bracket, said tube being threaded at its opposite ends; upper and lower caps threaded onto the opposite ends of the tube and each cap having a hole therethrough; a plunger rod for engagement with the mechanism of the scale to lock the same substantially stationary, said rod projecting through the interior of the tube and through the holes in the respective caps so as to be guided for reciprocation substantially axially of the tube; a stop on the plunger rod for engagement with the upper cap to limit the travel of the rod in scale locking direction; a compression spring telescopically positioned on the plunger rod, interiorly of the tube, one end of the spring engaging the stop and the other end engaging the lower cap; a solenoid, including an armature having a pivotal connection to the lower end of the plunger rod; an electrical circuit to the solenoid; an electrical switch in the circuit for closing the circuit to energize the solenoid whereby to retract the plunger rod against the tension of the spring whereupon to release the scale mechanism temporarily, said spring causing the plunger rod to be actuated into re-engagement with the scale mechanism when the circuit is opened and the solenoid is de-energized.

2. A locking device for automatically locking the mechanism of a scale having a mounting wall for the locking device comprising: a bracket adjustably secured to the mounting wall; an elongated tube secured to the bracket; upper and lower caps secured to the opposite ends of the tube and each cap having a hole therethrough; a plunger rod for engagement with the mechanism of the scale to lock the same substantially stationary, said rod projecting through the interior of the tube and through the holes in the respective caps so as to be guided for reciprocation substantially axially of the tube; a stop on the plunger rod for engagement with the upper cap to limit the travel of the rod in scale locking direction; a compression spring telescopically positioned on the plunger rod, interiorly of the tube, one end of the spring engaging the stop and the other end engaging the lower cap; a solenoid, including an armature having a pivotal connection to the lower end of the plunger rod; an electrical circuit to the solenoid; an electrical switch in the circuit for closing the circuit to energize the solenoid whereby to retract the plunger rod against the tension of the spring whereupon to release the scale mechanism temporarily, said spring causing the plunger rod to be actuated into re-engagement with the scale mechanism when the circuit is opened and the solenoid is deenergized.

3. A scale locking device as set forth in claim 2, including a cylinder secured to the bracket; a piston reciprocably mounted in the cylinder; a piston rod secured to the piston and projecting downwardly through the lower end of the cylinder; a bar secured to the plunger rod at one end and supporting the piston rod at its other end, whereby the piston is reciprocated within the cylinder each time the plunger rod is reciprocated and the reciprocation of the piston within the cylinder serves to temper the action of the spring in moving the plunger rod in scale locking direction whenever the electrical circuit is opened to de-energize the solenoid.

4. A locking device as set forth in claim 2, including spaced adjustment elements projecting outwardly from the mounting wall for engagement with the bracket whereby to adjust the bracket toward or away from the mounting wall and to adjust the vertical alignment of the bracket and attached tube, and a fastening element secured to the bracket and to the mounting wall for tightening the bracket against the adjustment element.

5. A locking device as set forth in claim 2, including a bar secured to the plunger rod and projecting outwardly therefrom, and a dash pot connected to the bar and actuated whenever the plunger rod is reciprocated in scale locking direction to cushion the action of the spring in forcing the plunger rod in scale locking direction.

References Cited in the file of this patent

UNITED STATES PATENTS

| | | |
|---|---|---|
| 1,663,985 | Hem | Mar. 27, 1928 |
| 1,674,302 | Royle | June 19, 1928 |
| 2,002,411 | Moxley | May 21, 1935 |